(12) United States Patent
Chiu et al.

(10) Patent No.: US 8,164,883 B2
(45) Date of Patent: Apr. 24, 2012

(54) STACKED SOLID ELECTROLYTIC CAPACITOR AND A METHOD FOR MANUFACTURING THE SAME

(75) Inventors: Chi-Hao Chiu, Hsinchu (TW); Ching-Feng Lin, Zhudong Township, Hsinchu County (TW); Chun-Chia Huang, Xinying (TW); Chien-Ting Liu, Taipei (TW)

(73) Assignee: Apaq Technology Co., Ltd., Miaoli County (TW)

( * ) Notice: Subject to any disclaimer, the term of this patent is extended or adjusted under 35 U.S.C. 154(b) by 176 days.

(21) Appl. No.: 12/813,980

(22) Filed: Jun. 11, 2010

(65) Prior Publication Data

US 2011/0122544 A1     May 26, 2011

(30) Foreign Application Priority Data

Nov. 23, 2009 (TW) .............................. 98139713 A

(51) Int. Cl.
*H01G 9/00* (2006.01)
(52) U.S. Cl. ............ 361/523; 361/517; 361/301.4; 361/301.5; 361/525; 361/528
(58) Field of Classification Search .............. 361/523, 361/516–517, 519, 301.4, 301.5, 525–529, 361/540–541
See application file for complete search history.

(56) References Cited

U.S. PATENT DOCUMENTS

| | | | | |
|---|---|---|---|---|
| 5,377,073 A | * | 12/1994 | Fukaumi et al. | 361/540 |
| 6,249,424 B1 | * | 6/2001 | Nitoh et al. | 361/523 |
| 6,563,693 B2 | * | 5/2003 | Nakada et al. | 361/523 |
| 6,977,807 B2 | * | 12/2005 | Arai et al. | 361/523 |
| 7,206,193 B2 | * | 4/2007 | Nagasawa et al. | 361/535 |
| 7,417,844 B2 | * | 8/2008 | Ishizuka et al. | 361/301.4 |

* cited by examiner

*Primary Examiner* — Nguyen T Ha
(74) *Attorney, Agent, or Firm* — Muncy, Geissler, Olds & Lowe, PLLC

(57) ABSTRACT

A stacked solid electrolytic capacitor and a method for manufacturing the same are disclosed. The stacked solid electrolytic capacitor includes two capacitor sets, a positive electrode conducting device, a negative electrode conducting device, and a package unit. Each capacitor set includes at least one capacitor unit. The front side of the positive electrode portion of the capacitor set extends to form a positive electrode pin. The positive electrode conducting device has at least one first positive electrode conducting lead frame and at least one second positive electrode conducting lead frame. The first positive electrode conducting lead frame is electrically connected with the second positive electrode conducting lead frame. The negative electrode conducting device has at least one negative electrode conducting lead frame, and is electrically connected with the negative electrode of the two capacitor sets by using metal conductive material.

28 Claims, 5 Drawing Sheets

S100a — Provide two capacitor sets, wherein each capacitor set includes at least one capacitor unit, each capacitor unit includes a positive electrode portion, a negative electrode portion and an insulating portion, the front side of the positive electrode portion extends to form a positive electrode pin, the insulating portion is surrounded into one circle and wraps one part of the surface of the positive electrode portion, and the negative electrode portion is located behind the insulating portion and wraps one part of the surface of the positive electrode portion S102a — The two capacitor sets are respectively and electrically connecting with a positive electrode conducting device and a negative electrode conducting device, wherein the positive electrode conducting device has at least one first positive electrode conducting lead frame and at least one second positive electrode conducting lead frame, the first positive electrode conducting lead frame and the second positive electrode conducting lead frame are respectively and electrically connected with the positive electrode pins of the two capacitor sets via a metal alloy layer, the first positive electrode conducting lead frame is electrically connected with the second positive electrode conducting lead frame, the negative electrode conducting device has at least one negative electrode conducting lead frame, and is electrically connected with the negative electrodes of the two capacitor sets by using metal conductive material S104a — Use a package unit to wrap the two capacitor sets and one part of the positive electrode conducting device and the negative electrode conducting device

FIG. 7

STACKED SOLID ELECTROLYTIC CAPACITOR AND A METHOD FOR MANUFACTURING THE SAME

BACKGROUND OF THE INVENTION

1. Field of the Invention

The present invention relates to a stacked solid electrolytic capacitor and a method for manufacturing the same. In particular, the present invention relates to a stacked solid electrolytic capacitor that reduces the positive electrode welding energy to prevent the current leakage from occurring and a method for manufacturing the same.

2. Description of Related Art

Capacitors are popularly used in the consumer household equipments, computer motherboards and the peripherals, power supplies, communication products, and cars. The functions of the capacitors include filtering, bypassing, rectifying, coupling, de-coupling, and phase-converting, etc. It is a key component for electronic devices. Capacitors have different types according materials and functions.

The solid electrolytic capacitor has a lot of merits, including small size, large capacitance, and good frequency characteristic, etc. The solid electrolytic capacitor can be used as a de-coupling function for the power circuit of the central processor. As shown in FIG. 1, the stacked solid electrolytic capacitor of the related art includes a plurality of capacitor units 10b. Each capacitor unit 10b includes a positive electrode portion 11b, a negative electrode portion 12b and an insulating portion 13b. The insulating portion 13b makes the positive electrode portion 11b be electrical insulated from the negative electrode portion 12b. The negative electrode portions 12b of the capacitor unit 10b are stacked. A conductive glue material is located between the capacitor units 10b so that the capacitor units 10b are electrically connected.

The front side of the positive electrode portion 11b of the capacitor unit 10b extends to form a positive electrode pin 14b. The positive electrode pin 14b is bent and is welded with a positive electrode conducting lead frame 20b to be electrically connected. However, when the quantity of the capacitor units become larger and larger, the quantity of the positive electrode pins 14b welded with the positive electrode conducting lead frames 20b also becomes larger so that the required welding energy also increases. High welding energy easily damages the oxidation aluminum dielectric layer (not shown in the figure) located on the surface of the positive electrode portion 11b of the capacitor unit 10b. Thereby, current leakage occurs. Furthermore, when the quantity of the capacitor units 10b is large, the positive electrode pin 14b of the electrode conducting lead frame 20b that is far away from the capacitor unit 10b is largely bent. The large bending size also damages the structure of the positive electrode portion 11b to make current leakage occur. The current leakage reduces the yield rate of the solid electrolytic capacitor. The circuit with the solid electrolytic capacitor also will be short-circuit, and its usage life is reduced.

SUMMARY OF THE INVENTION

One particular aspect of the present invention is to provide a stacked solid electrolytic capacitor and a method for manufacturing the same that reduces the required energy for welding the positive electrode pin with the positive electrode conducting lead frame so that the oxidation aluminum dielectric layer will not be damaged to prevent the current leakage from occurring.

The stacked solid electrolytic capacitor includes two capacitor sets, a positive electrode conducting device, a negative electrode conducting device, and a package unit. Each capacitor set includes at least one capacitor unit. Each capacitor unit includes a positive electrode portion, a negative electrode portion and an insulating portion. The front side of the positive electrode portion extends to form a positive electrode pin. The insulating portion is surrounded into one circle and wraps one part of the surface of the positive electrode portion. The negative electrode portion is located behind the insulating portion and wraps one part of the surface of the positive electrode portion. The positive electrode conducting device has at least one first positive electrode conducting lead frame and at least one second positive electrode conducting lead frame. The first positive electrode conducting lead frame is welded with the positive electrode pin of one of the capacitor sets, and the second positive electrode conducting lead frame is welded with the positive electrode pin of another capacitor set. The first positive electrode conducting lead frame is electrically connected with the second positive electrode conducting lead frame. The negative electrode conducting device has at least one negative electrode conducting lead frame, and is electrically connected with the negative electrodes of the two capacitor sets by using metal conductive material such as metal conductive paste or glue. The package unit wraps the two capacitor sets and part of the positive electrode conducting device and the negative electrode conducting device.

The method for manufacturing a stacked solid electrolytic capacitor includes the following steps. Two capacitor sets are provided. Each capacitor set includes at least one capacitor unit. Each capacitor unit includes a positive electrode portion, a negative electrode portion and an insulating portion. The front side of the positive electrode portion extends to form a positive electrode pin. The insulating portion is surrounded into one circle and wraps one part of the surface of the positive electrode portion. The negative electrode portion is located behind the insulating portion and wraps one part of the surface of the positive electrode portion. The two capacitor sets are respectively and electrically connected a positive electrode conducting device and a negative electrode conducting device. The positive electrode conducting device has at least one first positive electrode conducting lead frame and at least one second positive electrode conducting lead frame. The first positive electrode conducting lead frame is welded with the positive electrode pin of one of the capacitor sets, and the second positive electrode conducting lead frame is welded with the positive electrode pin of another capacitor set. The first positive electrode conducting lead frame is electrically connected with the second positive electrode conducting lead frame. The negative electrode conducting device has at least one negative electrode conducting lead frame, and is electrically connected with the negative electrodes of the two capacitor sets by using metal conductive material such as metal conductive paste or glue. A package unit is used for wrapping the two capacitor sets and part of the positive electrode conducting device and the negative electrode conducting device.

In the related art, all of the positive electrode pins of the capacitor units are welded onto one positive electrode conducting lead frame. When the quantity of the capacitor units increases, the required welding energy also increases to damage the oxidation aluminum dielectric layer and current leakage occurs. For the present invention, the capacitor units are divided into two capacitor sets. The two capacitor sets are respectively welded with at least one first positive electrode conducting lead frame and at least one second positive electrode conducting lead frame. The first positive electrode conducting lead frame and the second positive electrode conducting lead frame are electrically connected by using the metal conductive material. Thereby, the two capacitor sets can reduce the welding energy. Hence, the current leakage is lower after welding process.

Moreover, the positive electrode conducting device has a plurality of positive electrode conducting lead frames (at least one first positive electrode conducting lead frame and at least one second positive electrode conducting lead frame). The thickness of the stacked positive electrode conducting lead frames is larger than the thickness of the single positive electrode conducting lead frame. Therefore, the distance between the capacitor unit located at the outside and the positive electrode conducting lead frame can be reduced to reduce the bending size of the positive electrode pin. The current leakage problem is also avoided.

For further understanding of the present invention, referring to the following detailed description illustrating the embodiments and examples of the present invention. The description is for illustrative purpose only and is not intended to limit the scope of the claim.

BRIEF DESCRIPTION OF THE DRAWINGS

FIG. 7 is a flow chart of the method for manufacturing a stacked solid electrolytic capacitor of the second embodiment of the present invention.

DETAILED DESCRIPTION OF THE PREFERRED EMBODIMENTS

Figure 3:
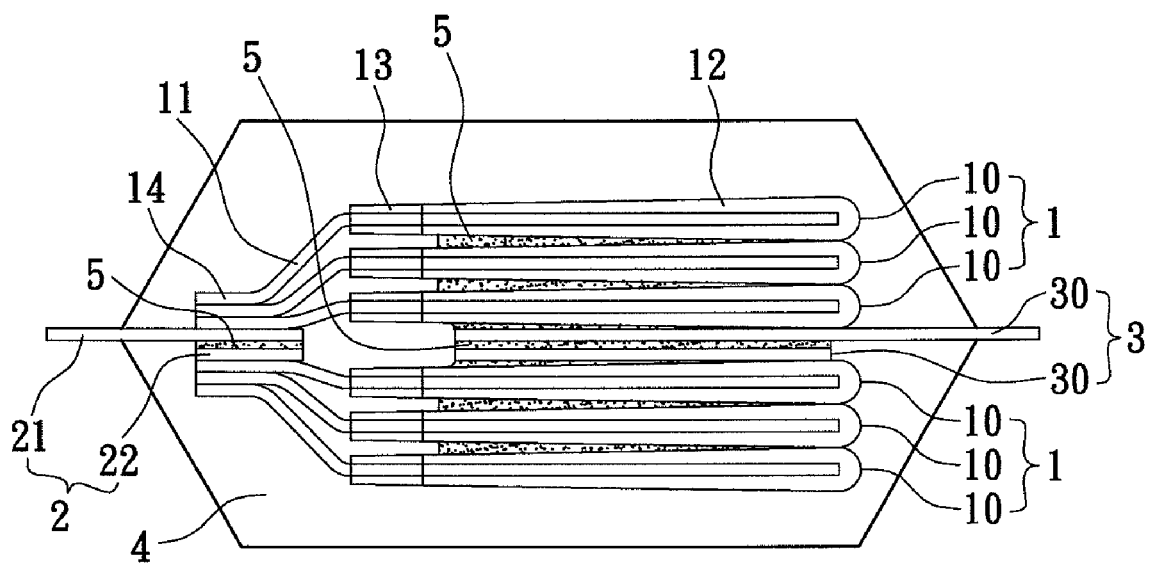
FIG. 3 is a side view of the stacked solid electrolytic capacitor of the first embodiment of the present invention.
Figure 4:
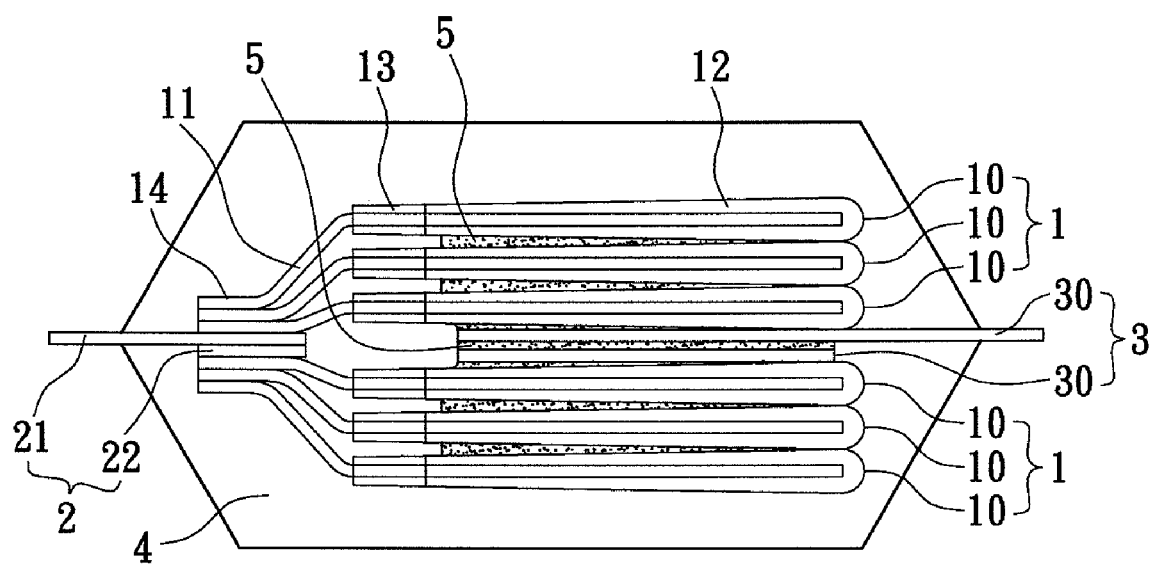
FIG. 4 is another side view of the stacked solid electrolytic capacitor of the first embodiment of the present invention.

Referring to FIGS. 3 and 4, which show the stacked solid electrolytic capacitor of the first embodiment of the present invention. The stacked solid electrolytic capacitor includes two capacitor sets 1, a positive electrode conducting device 2, a negative electrode conducting device 3, and a package unit 4.

Each capacitor set 1 includes at least one capacitor unit 10. Each capacitor unit 10 includes a positive electrode portion 11, a negative electrode portion 12 and an insulating portion 13. The front side of the positive electrode portion 11 extends and bends to form a positive electrode pin 14. The insulating portion 13 is surrounded into one circle and wraps one part of the surface of the positive electrode portion 11. The shape of the negative electrode portion 12 is U-shaped. The negative electrode portion 12 is located behind the insulating portion 13 and wraps one part of the surface of the positive electrode portion 11. The insulating portion 13 insulates the positive electrode portion 11 from the negative electrode portion 12. The positive electrode conducting device 2 has at least one first positive electrode conducting lead frame 21 and at least one second positive electrode conducting lead frame 22. The first positive electrode conducting lead frame 21 is welded with the positive electrode pin 14 of one of the capacitor sets 1, and the second positive electrode conducting lead frame 22 is welded with the positive electrode pin 14 of another capacitor set 1. The first positive electrode conducting lead frame 21 is electrically connected with the second positive electrode conducting lead frame 22 by using the welding method or using the metal conductive material 5. The welding method can be laser welding or resistance welding. The negative electrode conducting device 3 has at least one negative electrode conducting lead frame 30, and is electrically connected with the negative electrode portions 12 of the two capacitor sets 1 by using metal conductive material 5. The package unit 4 wraps the two capacitor sets 1 and part of the positive electrode conducting device 2 and the negative electrode conducting device 3.

Figure 1:
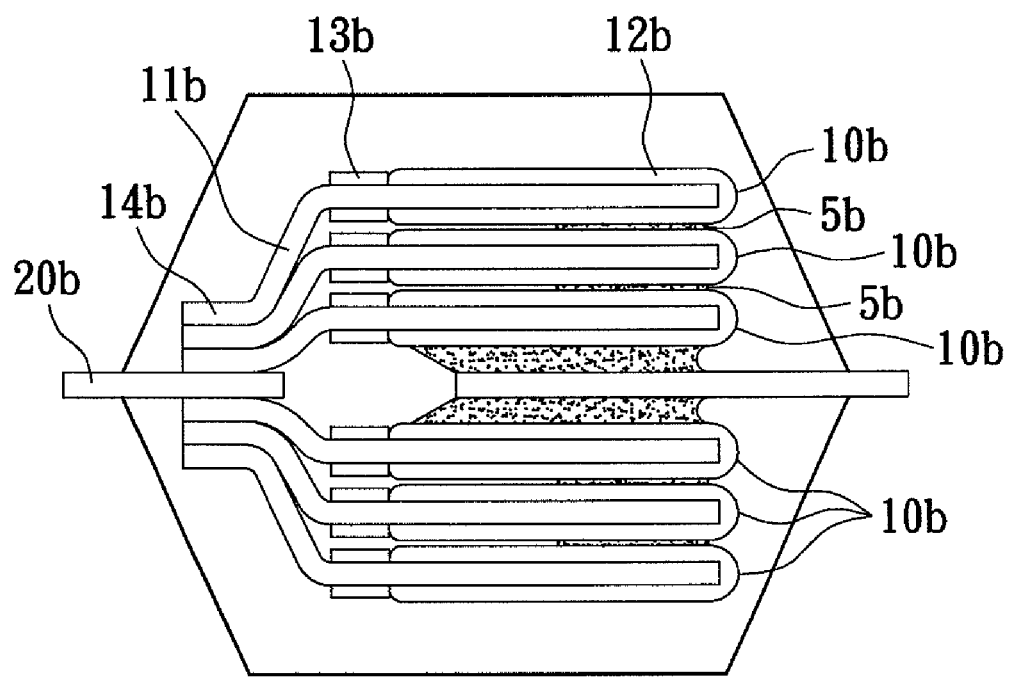
FIG. 1 is a side view of the solid electrolytic capacitor of the related art.
Figure 2:
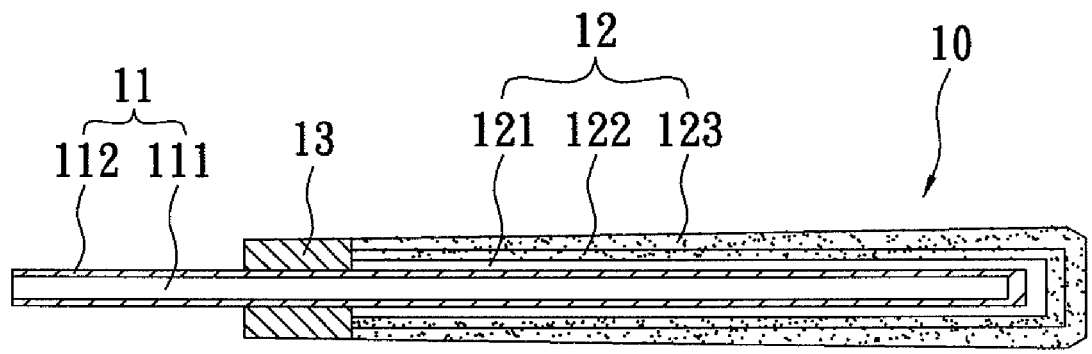
FIG. 2 is a cross-sectional view of a single capacitor unit of the stacked solid electrolytic capacitor of the present invention.

Referring to FIG. 2, which shows the cross-sectional view of a single capacitor unit 10. In the capacitor unit. 10, the positive electrode portion 11 includes an aluminum foil 111 and an oxidation aluminum dielectric layer 112. The oxidation aluminum dielectric layer 112 covers the surface of the aluminum foil 111. The oxidation aluminum dielectric layer 112 also forms an insulating effect between the positive electrode portion 11 and the negative electrode portion 12. The negative electrode portion 12 located behind the insulating portion 13 includes a conductive polymer layer 121, a graphite layer 122, and a metal conductive layer 123 that all are U-shaped. The conductive polymer layer 121 wraps part of surface of the oxidation aluminum dielectric layer 112. The graphite layer 122 wraps the surface of the conductive polymer layer 121. The metal conductive layer 123 wraps the graphite layer 122. The material of the metal conductive layer 123 can be silver glue or other conductive glue material.

Referring to FIG. 3. The positive electrode conducting device 2 has a first positive electrode conducting lead frame 21 and a second first positive electrode conducting lead frame 22. The negative electrode conducting device 3 has two negative electrode conducting lead frames 30. Each capacitor set 1 has a plurality of capacitor units 10. The capacitor units 10 are stacked together. The negative electrode portions of two capacitor units 10 are electrically connected by using the metal conductive material 5. The front sides of the positive electrode pins 14 of one capacitor set 1 are welded together and electrically connected with the first positive electrode conducting lead frame 21. The front sides of the positive electrode pins 14 of another capacitor set 1 are welded together and electrically connected with the second positive electrode conducting lead frame 22. The first positive electrode conducting lead frame 21 and the second positive electrode conducting lead frame 2 are electrically connected by using the metal conductive material 5. The negative electrode portion 12 of one capacitor set 1 is electrically connected with one of the negative electrode conducting lead frames 30 by using the metal conductive material 5. The two negative electrode conducting lead frames 30 are electrically connected by using the metal conductive material 5. Referring to FIG. 4. The first positive electrode conducting lead frame 21 also can be electrically connected with the second positive electrode conducting lead frame 22 by using the welding method.

However, the stacked solid electrolytic capacitor is not limited to the above embodiment. The quantity of the first positive electrode conducting lead frame 21, the second positive electrode conducting lead frame 22 and the negative electrode conducting lead frame 30 can be determine according to the requirements.

Figure 5:
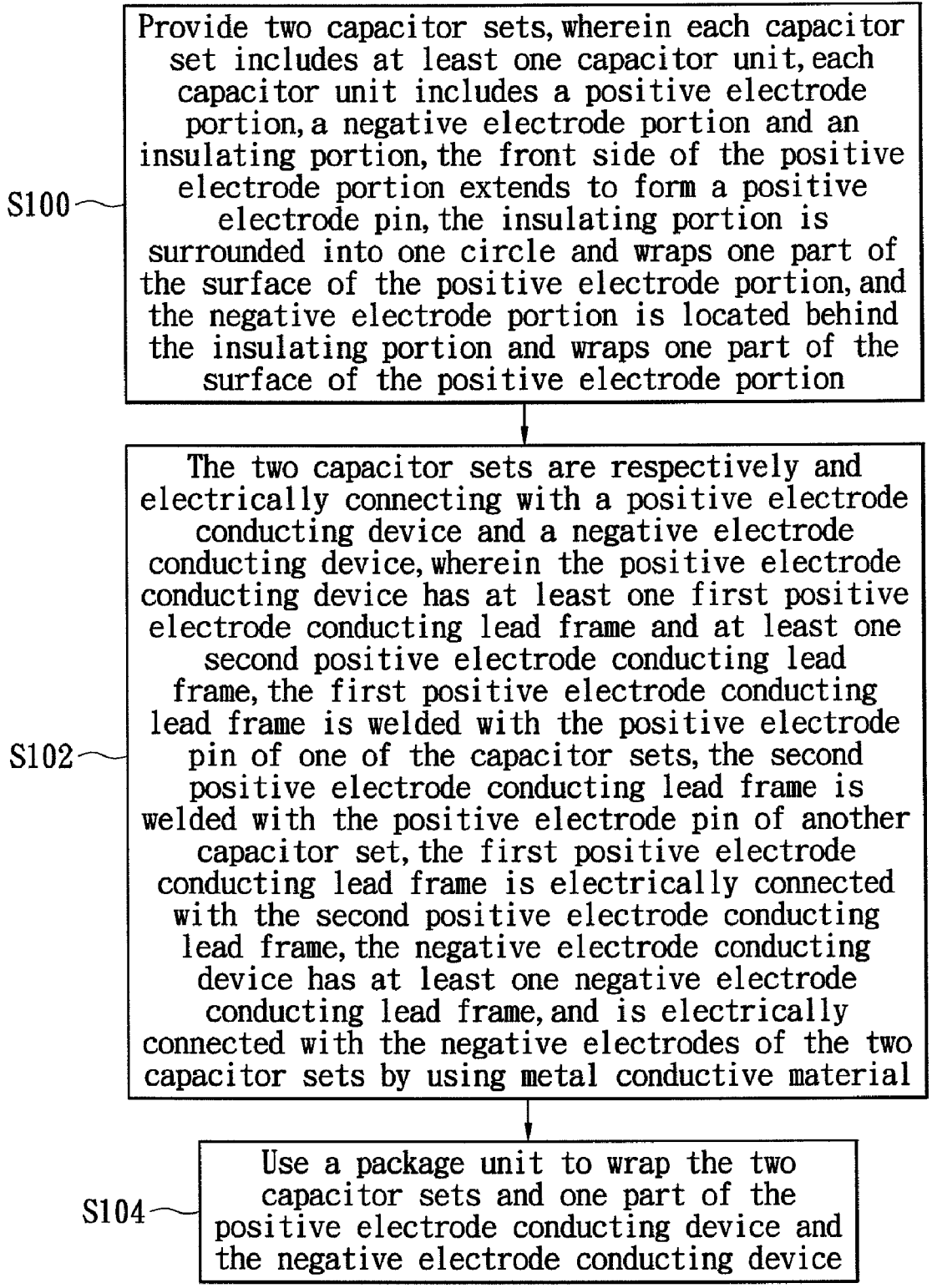
FIG. 5 is a flow chart of the method for manufacturing a stacked solid electrolytic capacitor of the first embodiment of the present invention.

Referring to FIG. 5, which shows the flow chart of the method for manufacturing a stacked solid electrolytic capacitor of the first embodiment of the present invention. The method for manufacturing a stacked solid electrolytic capacitor includes the following steps.

Two capacitor sets 1 are provided (step S100). Each capacitor set 1 includes at least one capacitor unit 10. Each capacitor unit 10 includes a positive electrode portion 11, a negative electrode portion 12 and an insulating portion 13. The front side of the positive electrode portion 11 extends and bends to form a positive electrode pin 14. The insulating portion 13 is surrounded into one circle and wraps one part of the surface of the positive electrode portion 11. The negative electrode portion 12 is U-shaped, is located behind the insulating portion 13 and wraps one part of the surface of the positive electrode portion 11. The insulating portion 13 forms an insulating effect between the positive electrode portion 11 and the negative electrode portion 12. When the capacitor set 1 has a plurality of capacitor units 10, the capacitor units 10 are stacked together. The negative electrode portions 12 of the two capacitor units 10 are electrically connected by using the metal conductive material 5.

The two capacitor sets 1 are respectively and electrically connected a positive electrode conducting device 2 and a negative electrode conducting device 3 (step 102). The positive electrode conducting device 2 has at least one first positive electrode conducting lead frame 21 and at least one second positive electrode conducting lead frame 22. The first positive electrode conducting lead frame 21 is welded with the positive electrode pin 14 of one of the capacitor sets 10, and the second positive electrode conducting lead frame 22 is welded with the positive electrode pin 14 of another capacitor set 10. The first positive electrode conducting lead frame 21 is electrically connected with the second positive electrode conducting lead frame 22 by using the metal conductive material 5 or the welding method. The welding method can be a laser or resistance welding method. The negative electrode conducting device 3 has at least one negative electrode conducting lead frame 30, and is electrically connected with the negative electrode portions 12 of the two capacitor sets 1 by using the metal conductive material 5. When the negative electrode conducting device 3 has a plurality of negative electrode conducting lead frames 30, the negative electrode conducting lead frames 30 are electrically connected together by using the metal conductive material 5. The metal conductive material 5 can be silver glue or other metal conductive material.

A package unit 4 is used for wrapping the two capacitor sets 1 and part of the positive electrode conducting device 2 and the negative electrode conducting device 3 (Step 104).

The stacked solid electrolytic capacitor and a method for manufacturing the same of the first embodiment of the present invention have the following characteristics.

1. The present invention divides the capacitor units 10 two capacitor sets 1, and the two capacitor sets 1 are respectively welded with at least one first positive electrode conducting lead frame 21 and at least one second positive electrode conducting lead frame 22. The first positive electrode conducting lead frame 21 and the second positive electrode conducting lead frame 22 are electrically connected by using the metal conductive material or the welding method. Thereby, the two capacitor sets 1 can share the welding energy to reduce the required welding energy. The oxidation aluminum dielectric layer 112 will not be damaged, and the current leakage problem or the short circuit problem is avoided.

2. The positive electrode conducting device 2 has a plurality of positive electrode conducting lead frames (at least one first positive electrode conducting lead frame 21 and at least one second positive electrode conducting lead frame 22). The thickness of the stacked positive electrode conducting lead frames is larger than the thickness of the single positive electrode conducting lead frame. Therefore, the distance between the capacitor unit 10 located at the outside and the positive electrode conducting lead frame can be reduced to reduce the bending degree of the positive electrode pin 14. The current leakage problem is also avoided.

Figure 6A:
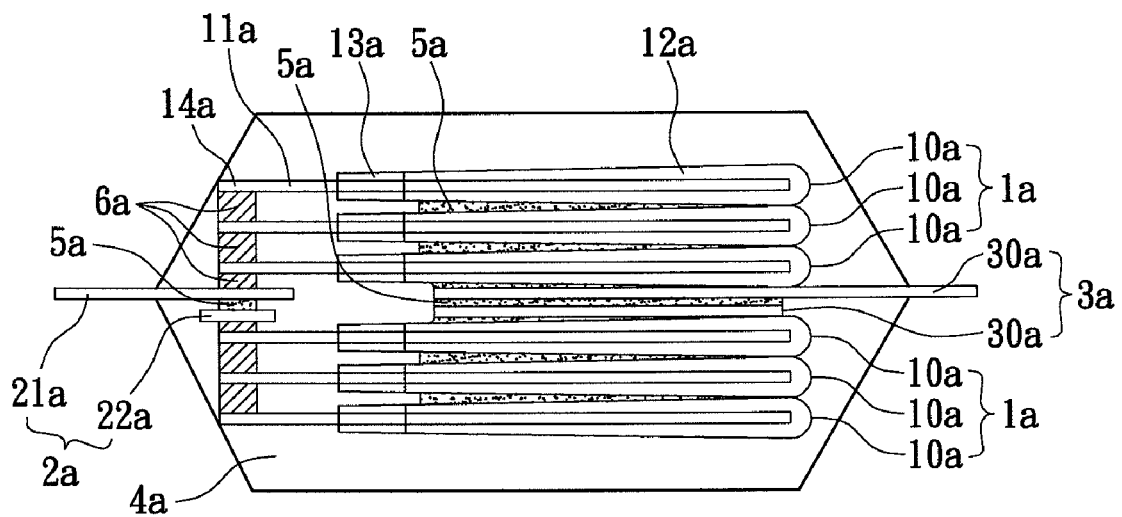
FIG. 6A is a side view of the stacked solid electrolytic capacitor of the second embodiment of the present invention.
Figure 6B:
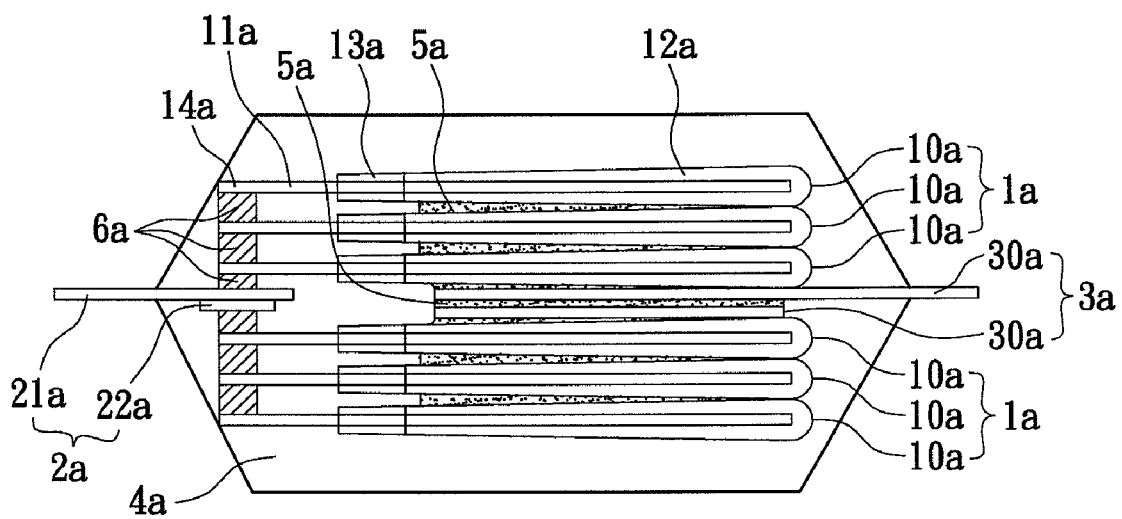
FIG. 6B is another side view of the stacked solid electrolytic capacitor of the second embodiment of the present invention.

Referring to FIGS. 6A and 6B, which shows the stacked solid electrolytic capacitor of the second embodiment of the present invention. The stacked solid electrolytic capacitor includes two capacitor sets 1a, a positive electrode conducting device 2a, a negative electrode conducting device 3a, and a package unit 4a.

Each capacitor set 1a includes at least one capacitor unit 10a. Each capacitor unit 10a includes a positive electrode portion 11a, a negative electrode portion 12a and an insulating portion 13a. The front side of the positive electrode portion 11a extends to form a positive electrode pin 14a. The insulating portion 13a is surrounded into one circle and wraps one part of the surface of the positive electrode portion 11a. The shape of the negative electrode portion 12a is U-shaped. The negative electrode portion 12a is located behind the insulating portion 13a and wraps one part of the surface of the positive electrode portion 11a. The insulating portion 13a insulates the positive electrode portion 11a from the negative electrode portion 12a. The positive electrode conducting device 2a has at least one first positive electrode conducting lead frame 21a and at least one second positive electrode conducting lead frame 22a. The first positive electrode conducting lead frame 21a and the second positive electrode conducting lead frame 22a respectively and electrically connected with the positive electrode pins 14a of the two capacitor sets 1a via a metal alloy layer 6a. The first positive electrode conducting lead frame 21a is electrically connected with the second positive electrode conducting lead frame 22a by using the welding method or using the metal conductive material 5a. The negative electrode conducting device 3a has at least one negative electrode conducting lead frame 30a, and is electrically connected with the negative electrode portions 12a of the two capacitor sets 1a by using metal conductive material 5. The metal conductive material 5 can be silver glue or other metal conductive material. The package unit 4a wraps the two capacitor sets 1a and part of the positive electrode conducting device 2a and the negative electrode conducting device 3a.

Referring to FIG. 6A. The positive electrode conducting device 2a has a first positive electrode conducting lead frame 21a and a second first positive electrode conducting lead frame 22a. The negative electrode conducting device 3a has two negative electrode conducting lead frames 30a. Each capacitor set 1a has a plurality of capacitor units 10a. The capacitor units 10a are stacked together. The negative electrode portions 12a of two capacitor units 10a are electrically connected by using the metal conductive material 5a. The positive electrode pins 14a that are adjacent are respectively and electrically connected with a metal alloy layer 6a. The first positive electrode conducting lead frame 21 and the second positive electrode conducting lead frame 22 are respectively and electrically connected with the positive electrode pins 14a of the two capacitor sets 1a via a metal alloy layer 6a. The metal alloy layer 6a is electrically connected with the positive electrode conducting device 2a and the positive electrode pins 14a via a welding method. The first positive electrode conducting lead frame 21a and the second positive electrode conducting lead frame 22a are electrically connected by using the metal conductive material 5a. The negative electrode portion 12a of one capacitor set 1a is electrically connected with one of the negative electrode conducting lead frames 30a by using the metal conductive material 5a. The negative electrode portion 12a of another capacitor set 1a is electrically connected with another negative electrode conducting lead frames 30a by using the metal conductive material 5a. The two negative electrode conducting lead frames 30a are electrically connected by using the metal conductive material 5a. Referring to FIG. 6B. The first positive electrode conducting lead frame 21a also can be electrically connected with the second positive electrode conducting lead frame 22a by using the welding method.

The metal alloy layer 6a can be copper-tin alloy, copper alloy electroplated with tin, or other conductive alloy. The thickness of the metal alloy layer 6a has a pre-determined thickness so that the bending size of the positive electrode pin 14a can be reduced to prevent the current leakage from occurring.

Referring to FIG. 7, which shows the flow chart of the method for manufacturing a stacked solid electrolytic capacitor of the second embodiment of the present invention. The method for manufacturing a stacked solid electrolytic capacitor includes the following steps.

Two capacitor sets 1a are provided (step S100a). Each capacitor set 1a includes at least one capacitor unit 10a. Each capacitor unit 10a includes a positive electrode portion 11a, a negative electrode portion 12a and an insulating portion 13a. The front side of the positive electrode portion 11a extends and bends to form a positive electrode pin 14a. The insulating portion 13a is surrounded into one circle and wraps one part of the surface of the positive electrode portion 11a. The negative electrode portion 12a is U-shaped, is located behind the insulating portion 13a and wraps one part of the surface of the positive electrode portion 11a. The insulating portion 13a forms an insulating effect between the positive electrode portion 11a and the negative electrode portion 12a. When the capacitor set 1a has a plurality of capacitor units 10a, the capacitor units 10a are stacked together. The negative electrode portions 12aa of the two capacitor units 10a are electrically connected by using the metal conductive material 5a.

The two capacitor sets 1a are respectively and electrically connected a positive electrode conducting device 2a and a negative electrode conducting device 3a (step 102a). The positive electrode conducting device 2a has at least one first positive electrode conducting lead frame 21a and at least one second positive electrode conducting lead frame 22a. The first positive electrode conducting lead frame 21a is electrically connected with the second positive electrode conducting lead frame 22a by using the metal conductive material 5a or the welding method. The negative electrode conducting device 3a has at least one negative electrode conducting lead frame 30a, and is electrically connected with the negative electrode portions 12a of the two capacitor sets 1a by using the metal conductive material 5a. When the negative electrode conducting device 3a has a plurality of negative electrode conducting lead frames 30a, the negative electrode conducting lead frames 30a are electrically connected together by using the metal conductive material 5a. The metal conductive material 5 can be silver glue or other metal conductive material.

A package unit 4a is used for wrapping the two capacitor sets 1a and part of the positive electrode conducting device 2a and the negative electrode conducting device 3a (Step 104a).

The stacked solid electrolytic capacitor and a method for manufacturing the same of the first embodiment of the present invention also can share and reduce the required welding energy for the positive electrodes. It also utilizes the thickness of the metal alloy layer 6a to reduce the bending size of the positive electrode pin 14. Thereby, the current leakage problem is avoided.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A stacked solid electrolytic capacitor, comprising:
   two capacitor sets, wherein each capacitor set includes at least one capacitor unit, each capacitor unit includes a positive electrode portion, a negative electrode portion and an insulating portion, the front side of the positive electrode portion extends to form a positive electrode pin, the insulating portion is surrounded into one circle and wraps one part of the surface of the positive electrode portion, and the negative electrode portion is located behind the insulating portion and wraps one part of the surface of the positive electrode portion;
   a positive electrode conducting device, wherein the positive electrode conducting device has at least one first positive electrode conducting lead frame and at least one second positive electrode conducting lead frame, the first positive electrode conducting lead frame is welded with the positive electrode pin of one of the capacitor sets, the second positive electrode conducting lead frame is welded with the positive electrode pin of another capacitor set, and the first positive electrode conducting lead frame is electrically connected with the second positive electrode conducting lead frame;
   a negative electrode conducting device, wherein the negative electrode conducting device has at least one negative electrode conducting lead frame, and is electrically connected with the negative electrodes of the two capacitor sets by using metal conductive material; and
   a package unit, wherein the package unit wraps the two capacitor sets and part of the positive electrode conducting device and the negative electrode conducting device.

2. The stacked solid electrolytic capacitor as claimed in claim 1, wherein each of the capacitor sets has a plurality of capacitor units, the capacitor units are stacked, the negative electrode portions of the two capacitor units are electrically connected by using metal conductive material.

3. The stacked solid electrolytic capacitor as claimed in claim 2, wherein the negative electrode conducting device has a plurality of negative electrode conducting lead frames, the negative electrode conducting lead frames are electrically connected by using metal conductive material.

4. The stacked solid electrolytic capacitor as claimed in claim 3, wherein the metal conductive material is silver glue.

5. The stacked solid electrolytic capacitor as claimed in claim 1, wherein the welding method is implemented by laser welding or resistance welding.

6. The stacked solid electrolytic capacitor as claimed in claim 1, wherein the first positive electrode conducting lead frame and the second positive electrode conducting lead frame are electrically connected by using metal conductive material.

7. The stacked solid electrolytic capacitor as claimed in claim 1, wherein the first positive electrode conducting lead frame and the second positive electrode conducting lead frame are electrically connected by using the welding method.

8. A method for manufacturing a stacked solid electrolytic capacitor, comprising:

providing two capacitor sets, wherein each capacitor set includes at least one capacitor unit, each capacitor unit includes a positive electrode portion, a negative electrode portion and an insulating portion, the front side of the positive electrode portion extends to form a positive electrode pin, the insulating portion is surrounded into one circle and wraps one part of the surface of the positive electrode portion, and the negative electrode portion is located behind the insulating portion and wraps one part of the surface of the positive electrode portion;

respectively and electrically connecting the two capacitor sets with a positive electrode conducting device and a negative electrode conducting device, wherein the positive electrode conducting device has at least one first positive electrode conducting lead frame and at least one second positive electrode conducting lead frame, the first positive electrode conducting lead frame is welded with the positive electrode pin of one of the capacitor sets, the second positive electrode conducting lead frame is welded with the positive electrode pin of another capacitor set, the first positive electrode conducting lead frame is electrically connected with the second positive electrode conducting lead frame, the negative electrode conducting device has at least one negative electrode conducting lead frame, and is electrically connected with the negative electrodes of the two capacitor sets by using metal conductive material; and using a package unit to wrap the two capacitor sets and part of the positive electrode conducting device and the negative electrode conducting device.

9. The method as claimed in claim 8, wherein each of the capacitor sets has a plurality of capacitor units, the capacitor units are stacked, the negative electrode portions of the two capacitor units are electrically connected by using metal conductive material.

10. The method as claimed in claim 9, wherein the negative electrode conducting device has a plurality of negative electrode conducting lead frames, the negative electrode conducting lead frames are electrically connected by using metal conductive material.

11. The method as claimed in claim 10, wherein the metal conductive material is silver glue.

12. The method as claimed in claim 8, wherein the welding method is implemented by laser welding or resistance welding.

13. The method as claimed in claim 8, wherein the first positive electrode conducting lead frame and the second positive electrode conducting lead frame are electrically connected by using metal conductive material.

14. The method as claimed in claim 8, wherein the first positive electrode conducting lead frame and the second positive electrode conducting lead frame are electrically connected by using the welding method.

15. A stacked solid electrolytic capacitor, comprising:

two capacitor sets, wherein each capacitor set includes at least one capacitor unit, each capacitor unit includes a positive electrode portion, a negative electrode portion and an insulating portion, the front side of the positive electrode portion extends to form a positive electrode pin, the insulating portion is surrounded into one circle and wraps one part of the surface of the positive electrode portion, and the negative electrode portion is located behind the insulating portion and wraps one part of the surface of the positive electrode portion;

a positive electrode conducting device, wherein the positive electrode conducting device has at least one first positive electrode conducting lead frame and at least one second positive electrode conducting lead frame, the first positive electrode conducting lead frame and the second positive electrode conducting lead frame are respectively and electrically connected with the positive electrode pins of the two capacitor sets via a metal alloy layer, and the first positive electrode conducting lead frame is electrically connected with the second positive electrode conducting lead frame;

a negative electrode conducting device, wherein the negative electrode conducting device has at least one negative electrode conducting lead frame, and is electrically connected with the negative electrodes of the two capacitor sets by using metal conductive material; and a package unit, wherein the package unit wraps the two capacitor sets and part of the positive electrode conducting device and the negative electrode conducting device.

16. The stacked solid electrolytic capacitor as claimed in claim 15, wherein each of the capacitor sets has a plurality of capacitor units, the capacitor units are stacked, the negative electrode portions of the two capacitor units are electrically connected by using metal conductive material, and the two positive electrode pins that are adjacent are respectively and electrically connected via a metal alloy layer.

17. The stacked solid electrolytic capacitor as claimed in claim 16, wherein the metal alloy layer is a copper-tin alloy, or a copper alloy electroplated with tin.

18. The stacked solid electrolytic capacitor as claimed in claim 16, wherein the metal conductive material is silver glue.

19. The stacked solid electrolytic capacitor as claimed in claim 16, wherein the metal alloy layers are electrically connected with the positive electrode conducting devices and the positive electrode pins by using the welding method.

20. The stacked solid electrolytic capacitor as claimed in claim 15, wherein the first positive electrode conducting lead frame and the second positive electrode conducting lead frame are electrically connected by using metal conductive material.

21. The stacked solid electrolytic capacitor as claimed in claim 15, wherein the first positive electrode conducting lead frame and the second positive electrode conducting lead frame are electrically connected by using the welding method.

22. A method for manufacturing a stacked solid electrolytic capacitor, comprising:

providing two capacitor sets, wherein each capacitor set includes at least one capacitor unit, each capacitor unit includes a positive electrode portion, a negative electrode portion and an insulating portion, the front side of the positive electrode portion extends to form a positive electrode pin, the insulating portion is surrounded into one circle and wraps one part of the surface of the positive electrode portion, and the negative electrode portion is located behind the insulating portion and wraps one part of the surface of the positive electrode portion;

respectively and electrically connecting the two capacitor sets with a positive electrode conducting device and a negative electrode conducting device, wherein the positive electrode conducting device has at least one first positive electrode conducting lead frame and at least one second positive electrode conducting lead frame, the first positive electrode conducting lead frame and the second positive electrode conducting lead frame are respectively and electrically connected with the positive electrode pins of the two capacitor sets via a metal alloy layer, the first positive electrode conducting lead frame is electrically connected with the second positive electrode conducting lead frame, the negative electrode conducting device has at least one negative electrode conducting lead frame, and is electrically connected with the negative electrodes of the two capacitor sets by using metal conductive material; and using a package unit to wrap the two capacitor sets and part of the positive electrode conducting device and the negative electrode conducting device.

23. The method as claimed in claim 22, wherein each of the capacitor sets has a plurality of capacitor units, the capacitor units are stacked, the negative electrode portions of the two capacitor units are electrically connected by using metal conductive material, and the two positive electrode pins that are adjacent are respectively and electrically connected via a metal alloy layer.

24. The method as claimed in claim 23, wherein the metal alloy layer is a copper-tin alloy, or a copper alloy electroplated with tin.

25. The method as claimed in claim 23, wherein the metal conductive material is silver glue.

26. The method as claimed in claim 23, wherein the metal alloy layers are electrically connected with the positive electrode conducting devices and the positive electrode pins by using the welding method.

27. The method as claimed in claim 22, wherein the first positive electrode conducting lead frame and the second positive electrode conducting lead frame are electrically connected by using metal conductive material.

28. The method as claimed in claim 22, wherein the first positive electrode conducting lead frame and the second positive electrode conducting lead frame are electrically connected by using the welding method.

* * * * *